(12) United States Patent
Moarefi et al.

(10) Patent No.: US 11,845,374 B2
(45) Date of Patent: Dec. 19, 2023

(54) LOADING SYSTEM AND METHOD FOR LATERALLY LOADING AND UNLOADING AN UPPER BODY STRUCTURE ONTO AND FROM A VEHICLE PLATFORM OF A MOTOR VEHICLE

(71) Applicants: Hyundai Motor Company, Seoul (KR); Kia Corporation, Seoul (KR)

(72) Inventors: Bahman Moarefi, Mainz (DE); Andrew Vaughan, Mainz (DE); Vincent Laurent, Frankfurt am Main (DE); Miroslav Kropac, Mainz-Finthen (DE); Jelle Tjebbes, Frankfurt am Main (DE); Sebastian Kluh, Gimbsheim (DE); Ameya Karmarkar, Russelsheim (DE); Rolf Verhoeven, Frankfurt am Main (DE); Kadir Oguzcan Ger, Mainz (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 280 days.

(21) Appl. No.: 17/329,809

(22) Filed: May 25, 2021

(65) Prior Publication Data
US 2022/0306220 A1 Sep. 29, 2022

(30) Foreign Application Priority Data
Mar. 23, 2021 (DE) .......................... 102021202833.0

(51) Int. Cl.
*B60P 1/48* (2006.01)
*B62D 63/02* (2006.01)
(Continued)

(52) U.S. Cl.
CPC ............. *B60P 1/486* (2013.01); *B60P 1/5428* (2013.01); *B60P 1/6472* (2013.01); *B60P 7/13* (2013.01);
(Continued)

(58) Field of Classification Search
CPC ....... B60P 1/486; B60P 1/5428; B60P 1/6472; B60P 7/13; B62D 63/025
(Continued)

(56) References Cited

U.S. PATENT DOCUMENTS 3,096,894 A * 7/1963 Proler et al. .......... B60P 1/6418
414/469
3,638,804 A * 2/1972 Blakeway ............. B60P 1/5428
212/292
(Continued)

FOREIGN PATENT DOCUMENTS

WO WO-2019133790 A1 * 7/2019 ................ B60P 1/64

*Primary Examiner* — James Keenan
(74) *Attorney, Agent, or Firm* — Fox Rothschild LLP (57) ABSTRACT

A loading system laterally loads and unloads an upper body structure onto a vehicle platform of a motor vehicle. The system includes two loading arms pivotably mounted on lengthwise ends of the vehicle platform. The loading arms jointly swivel between upward and lateral orientations with respect to the vehicle platform and jointly extend and retract. Each loading arm has an engaging portion at a distal end of the respective loading arm to engage a corresponding support portion at a respective lengthwise end of the upper body structure. The loading arms engage and release the upper body structure by swiveling into the lateral orientation and extending and retracting within the lateral orientation. The loading arms mount the engaged upper body structure on top of the vehicle platform by swiveling with the engaged upper
(Continued)

body structure into the upward orientation and retracting with the engaged upper body structure within the upward orientation.

8 Claims, 5 Drawing Sheets

(51) Int. Cl.
*B60P 1/64* (2006.01)
*B60P 1/54* (2006.01)
*B60P 7/13* (2006.01)
*B60S 9/02* (2006.01)
*F16B 1/04* (2006.01)

(52) U.S. Cl.
CPC ............... *B62D 63/025* (2013.01); *B60S 9/02* (2013.01); *F16B 1/04* (2013.01); *F16B 2200/83* (2023.08); *F16B 2200/99* (2023.08)

(58) Field of Classification Search
USPC ........ 410/80, 81, 90, 91; 414/486, 498, 522, 414/547
See application file for complete search history.

(56) References Cited

U.S. PATENT DOCUMENTS

| | | | | |
|---|---|---|---|---|
| 3,811,581 | A * | 5/1974 | Van Der Lely | B66C 23/36 414/498 |
| 3,876,088 | A * | 4/1975 | Klaus | B60P 1/6472 414/547 |
| 3,927,622 | A * | 12/1975 | Voigt | B60P 7/13 410/79 |
| 4,183,708 | A * | 1/1980 | Kuhbier | B60P 3/03 414/498 |
| 4,522,549 | A * | 6/1985 | Niva | B60P 1/483 296/35.3 |
| 5,467,827 | A * | 11/1995 | McLoughlin | B60P 1/6427 414/535 |
| 6,089,670 | A * | 7/2000 | Rogers | B60P 1/486 414/500 |
| 2021/0122431 | A1* | 4/2021 | Kazimiers | B62D 65/024 |
| 2021/0245816 | A1* | 8/2021 | Hwang | B62D 63/025 |

* cited by examiner

LOADING SYSTEM AND METHOD FOR LATERALLY LOADING AND UNLOADING AN UPPER BODY STRUCTURE ONTO AND FROM A VEHICLE PLATFORM OF A MOTOR VEHICLE

CROSS-REFERENCE TO RELATED APPLICATION(S)

This application claims under 35 U.S.C. § 119(a) the benefit of German Patent Application No. 102021202833 filed on Mar. 23, 2021, the entire contents of which are incorporated herein by reference.

TECHNICAL FIELD

The present invention pertains to a loading system and a method for laterally loading and unloading an upper body structure onto and from a vehicle platform of a motor vehicle. The present invention further pertains to a motor vehicle, in particular an electric motor vehicle, with such a loading system.

BACKGROUND

Recently, some manufacturers of vehicles and automotive parts have put their focus on developing standardized and scalable electric vehicle (EV) platforms to underpin future vehicles in line with a completely new vehicle architecture to save development time and costs and thus get new electric vehicles on the road faster. Accordingly, modular electric-rolling and ready-to-drive platforms, a.k.a. "skateboards", are specifically designed to be mated with bodies of varies types and shapes. In this approach, the vehicle platform represents the part common to all vehicles and may combine chassis, powertrain, energy storage, crash management and so on. The upper body structure or "top hat" on the other hand comes in several variants specifically designed for different purposes according to the specific need of the customer.

Such purpose-built vehicles (PBV) may be designed for specific applications, like last-mile delivery or autonomous shuttles. They are designed from the start with specific applications in mind, and because of the standardization efforts up front, they may be produced at scale at a much lower price point than could otherwise be achieved. Purpose-built EV platforms may not only be lower in material cost but may also allow better performance in range, acceleration and interior space. Moreover, designing the vehicle architecture entirely around an EV concept, without combustion-engine legacy elements, means fewer compromises and more flexibility on average.

With the modular separation of the vehicle structure, a need arises to swap different body structures rapidly and smoothly on top of a vehicle platform.

SUMMARY

Accordingly, there is a need to find simple yet effective solutions for loading a vehicle platform with an upper body structure.

According to one aspect of the invention, a loading system for laterally loading and unloading an upper body structure onto and from a vehicle platform of a motor vehicle may include two loading arms pivotably mounted on respective lengthwise ends of the vehicle platform, the loading arms being configured to jointly swivel between an upward orientation and a lateral orientation with respect to the vehicle platform and to jointly extend and retract, each loading arm having an engaging portion at a distal end of the respective loading arm configured to engage a correspondingly formed support portion at a respective lengthwise end of the upper body structure. The loading arms may be configured to engage and release, respectively, the upper body structure by swiveling into the lateral orientation and by extending and retracting, respectively, within the lateral orientation. Additionally, the loading arms may be configured to mount the engaged upper body structure on top of the vehicle platform by swiveling with the engaged upper body structure into the upward orientation and by retracting with the engaged upper body structure within the upward orientation.

According to another aspect of the invention, a motor vehicle, in particular an electric motor vehicle, has a loading system according to the invention.

According to yet another aspect of the invention, a method is provided for loading and unloading an upper body structure onto and from a vehicle platform of a motor vehicle, in particular an electric motor vehicle. The loading system may include two loading arms pivotably mounted on respective lengthwise ends of the vehicle platform, the loading arms jointly swiveling between an upward orientation and a lateral orientation with respect to the vehicle platform and jointly extending and retracting, each loading arm having an engaging portion at a distal end of the respective loading arm configured to engage a correspondingly formed support portion at a respective lengthwise end of the upper body structure. The method may include engaging and releasing, respectively, the upper body structure with the loading arms by swiveling the loading arms into the lateral orientation and by extending and retracting, respectively, the loading arms within the lateral orientation; and mounting the engaged upper body structure on top of the vehicle platform by swiveling the loading arms with the engaged upper body structure into the upward orientation and by retracting the loading arms with the engaged upper body structure within the upward orientation.

One idea of the present invention is to provide the vehicle platform itself with the means to load and unload the upper body structure quickly and smoothly without the need for additional tools, components and/or devices. Accordingly, the present invention provides a swivel arm mechanism, in which a swapping procedure is realized by two swivel arms mounted on each lengthwise end of the vehicle platform. The swivel arms perform a movement sequence including rotation (swiveling) and translation (extension and retraction) to load an upper body structure onto the vehicle platform and unload the upper body structure from it. Accordingly, PVB top hats, for example, may be exchanged quickly and independently. Thus, the present invention solves one of the main challenges of PVB mobility concepts by enabling loading and unloading within one integrated concept.

It is understood that the term "vehicle" or "vehicular" or other similar term as used herein is inclusive of motor vehicles in general such as passenger automobiles including sports utility vehicles (SUV), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles. Motor vehicles according to the invention comprise manually driven vehicles as well as more or less autonomously and/or automatically driven vehicles.

According to an exemplary embodiment of the invention, the loading arms may be configured as telescopic arms to retract and extend. Telescopic swivel arms may be provided for various load sizes, for example based on hydraulic or pneumatic concepts, and provide a very convenient yet robust solution for extendable arms.

According to an exemplary embodiment of the invention, each engaging portion may be configured as a lifting fork and the corresponding support portion may be configured as a pin extending from the upper body structure. For example, the engaging portion may include a head branching into two straight or more or less curved tines, which may grab or hold the pin on the upper body structure between each other. By providing a pin on each lengthwise end of the upper body structure, two such lifting forks may be employed in concert to engage and lift the upper body structure.

According to an exemplary embodiment of the invention, the loading arms may be configured to swivel to both lateral sides of the vehicle platform. Accordingly, loading and unloading is possible to both lateral sides of the vehicle platform. Thus, for example, one upper body structure may be removed from the vehicle platform to a first lateral side. Next, another upper body structure may directly be loaded onto the vehicle platform from the second lateral side.

According to an exemplary embodiment of the invention, the vehicle platform may include an extendable support leg at each lengthwise end configured to extend in the lateral direction and thereby stabilize the vehicle platform on the ground against tipping. The method may correspondingly include extending the support leg at each lengthwise end of the vehicle platform in the lateral direction thereby stabilizing the vehicle platform on the ground against tipping.

Hence, and in a similar vein as a mobile crane is supported by several support legs, the vehicle platform may be stabilized against tipping and rollover by two (or more) support legs. In one exemplary embodiment, the support legs may be configured to extend to both lateral sides. Alternatively, two (or more) support legs may be provided for each lateral side.

According to an exemplary embodiment of the invention, the loading arms may be configured to jointly retract and extend in interim orientations between the upward orientation and the lateral orientation to optimize the center of gravity of the engaged upper body structure. The method may correspondingly include jointly retracting and extending the loading arms in interim orientations between the upward orientation and the lateral orientation to optimize the center of gravity of the engaged upper body structure.

Accordingly, the upper body structure may be engaged laterally during a loading process, e.g. with both swivel arms oriented horizontally and fully extended, and may then be lifted in a first step to an interim orientation, in which the swivel arms are oriented in about a 45° angle with respect to the ground, for example. To reduce the lever arm of the arrangement and to change the center of gravity of the upper body structure conveniently to reduce load and moment acting on the vehicle platform, the swivel arms may be retracted telescopically to reduce the height of the upper body structure above ground. In a subsequent step, the swivel arms may then be jointly rotated from the interim orientation into the upward orientation to finish the loading process.

According to an exemplary embodiment of the invention, the vehicle platform and/or the upper body structure may be provided with a plurality of connection pins and correspondingly formed connection holes, into which the connections pins are introduced when the upper body structure is mounted on top of the vehicle platform. In one particular example, the vehicle platform may include several connection pins extending in the upward orientation. The upper body structure may then be mounted onto the vehicle platform such that the connection pins enter corresponding connection holes in an underside of the upper body structure. Accordingly, the upper body structure may be automatically aligned relatively to the vehicle platform.

According to an exemplary embodiment of the invention, each connection hole may include a movable locking pin configured to lock the connection pin within the connection hole. Hence, the upper body structure may be fastened to the vehicle platform in the aligned orientation as defined by the position of the connection pins on the vehicle platform. According to an exemplary embodiment of the invention, each locking pin and the corresponding connection pin may together form a switchable magnetic latch, wherein each locking pin may be configured as a permanent magnet and each connection pin may be configured as a rotatable permanent magnet to switch the magnetic latch.

In this exemplary embodiment, the connection between the upper body structure and the vehicle platform is realized by a simplified and fault-proof yet effective magnetic latch system, which may for example be integrated in connection holes within the upper body structure. However, a corresponding magnetic latch system may equally well be employed to fix the engaged upper body structure at its support portions to the engaging portions during loading/unloading.

The invention will be explained in greater detail with reference to exemplary embodiments depicted in the drawings as appended.

BRIEF DESCRIPTION OF THE DRAWINGS

The accompanying drawings are included to provide a further understanding of the present invention and are incorporated in and constitute a part of this specification. The drawings illustrate the exemplary embodiments of the present invention and together with the description serve to explain the principles of the invention. Other exemplary embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION OF THE EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Figure 1:
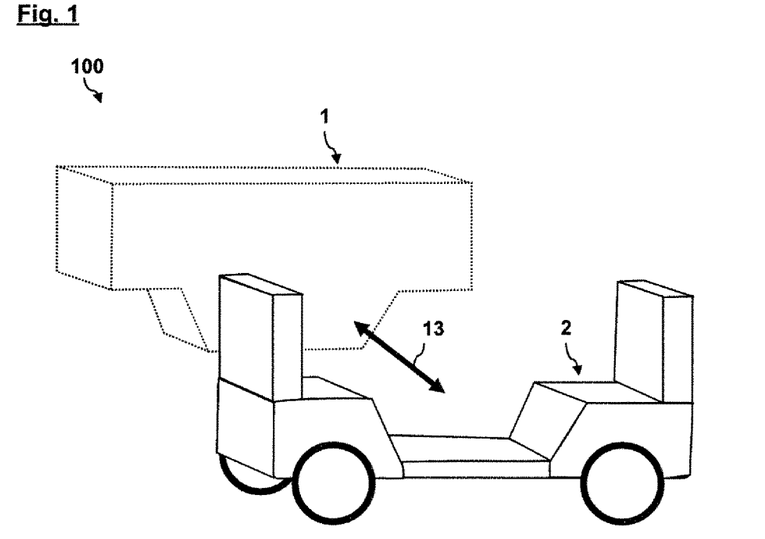
FIG. 1 schematically depicts a modular motor vehicle having a vehicle platform that may be equipped with a purpose-built upper body structure.
Figure 2:
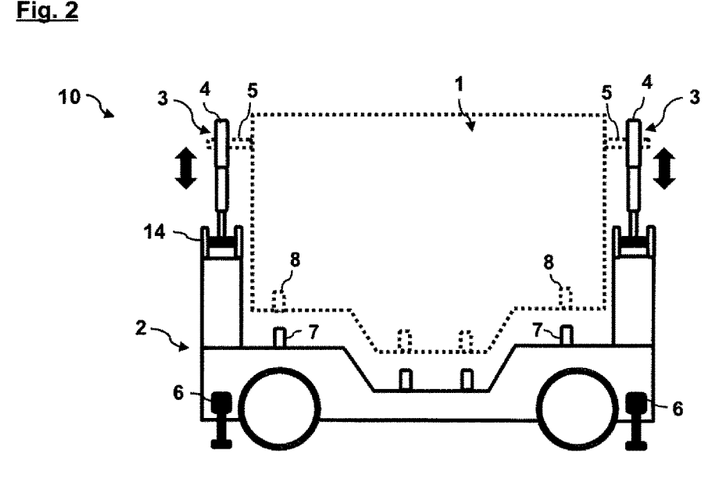
FIG. 2 schematically shows a side view of a loading system for the motor vehicle of FIG. 1 according to an exemplary embodiment of the invention.

FIG. 1 schematically depicts a modular motor vehicle 100 having a vehicle platform 2 that may be equipped with an upper body structure 1 in a lateral direction 13. FIG. 2 schematically shows a side view of a loading system 10 according to an exemplary embodiment of the invention for loading the upper body structure 1 onto the vehicle platform 2 of the motor vehicle 100 of FIG. 1 and to unload it from there.

The motor vehicle 100 may be, for example, a purpose-built electric vehicle that is designed in a modular fashion based on two main parts, namely the vehicle platform 2 or skateboard and the upper body structure 1 or hat. The vehicle platform 2 represents the common substructure of the EV comprising chassis, powertrain, electric batteries and so on. The upper body structure 1 may come in different variants fulfilling various purposes according to the customer's needs (e.g. cargo transportation like last-mile delivery or similar, passenger transportation like autonomous shuttle services, buses, taxis and so on).

In the exemplary embodiment of FIG. 1, the vehicle platform 2 is U-shaped, while the upper body structure 1 is complementary formed according to a V. It is to be understood of course that the shown shape and configuration is merely an example. Other shapes and configurations are of course possible, e.g. a flat vehicle platform 2 with a box-shaped upper body structure 1 on top of it.

The motor vehicle 100 may be for example autonomously and/or automatically driven and may be equipped with various sensor systems as they are known in the art to monitor the environment and generate appropriate steering commands. Such sensors may also be utilized to monitor and steer the loading/unloading process of the motor vehicle 100.

The loading system 10 provides a simplified and rapid swapping concept that solves one of the main challenges for PBV, namely how to load the upper body structure 1 onto the vehicle platform 2. As will be explained in the following, the present solution makes it possible to load and unload the upper body structure 1 in one step without having to lift heavy loads. Loading and unloading is possible in this case from both lateral sides of the vehicle platform 2. In this vein, it may be possible to rapidly switch or swap one upper body structure 1 with another, e.g. by unloading a first upper body structure 1 to a first lateral side and by loading a second upper body structure 1 from a second lateral side.

Referring now to FIG. 2, the loading system 10 may include two loading arms 3 pivotably mounted via respective rotary drives 14 (e.g. electrically driven) on respective lengthwise ends of the vehicle platform 2. The loading arms 3 are configured to jointly swivel between an upward orientation (upwards in FIG. 2) and a lateral orientation (i.e. into and out of the plane of the figure) with respect to the vehicle platform 2. The loading arms 3 are configured as telescopic arms to jointly extend and retract. Accordingly, each loading arm 3 may have a plurality of telescopic segments or stages of different diameter slidably nested within each other, which may be pneumatically or hydraulically driven for example.

Furthermore, each loading arm 3 is configured as a lifting fork (e.g., also FIGS. 3 to 8), which means that the outermost segment of each loading arm 3 is provided with a fork-like engaging portion 4 at a distal end of the respective loading arm 3 and is such configured to engage a correspondingly formed support portion 5 at a respective lengthwise end of the upper body structure 1. In the exemplary embodiment of FIG. 2, the support portion 5 is provided as a pin that extends from a front side and a back side, respectively, of the upper body structure 3, which may be grabbed by the loading arms 3 via the engaging portion 4.

The loading arms 3 are configured to engage the upper body structure 1 by swiveling into the lateral orientation and by extending appropriately within the lateral orientation. Similarly, the loading arms 3 may be configured to release the upper body structure 1 by retracting within the lateral orientation. To mount the upper body structure 1 on top of the vehicle platform 1, the loading arms 3 may be configured to swivel with the engaged upper body structure 1 into the upward orientation and retract with the engaged upper body structure 1 within the upward orientation. Such a loading procedure is explained below with reference to FIGS. 3 to 8.

The vehicle platform 2 may further include a support leg 6 at each lengthwise end that is configured extendable in the lateral direction 14 to stabilize the vehicle platform 2 on the ground during loading against tipping or rolling over. In this particular exemplary embodiment, the support legs 6 may be extended to both lateral sides of the vehicle platform 2.

To fix the upper body structure 1 on the vehicle platform 2 once it is mounted on top of it, the vehicle platform 2 may include several connection pins 7 distributed across its upper surface. The upper body structure 1 may include correspondingly formed connection holes 8, into which the connection pins 7 may be inserted in the mounted position of the upper body structure 1 on top of the vehicle platform 2. Each connection hole 8 may include a locking pin 9 that forms a switchable magnetic latch in collaboration with the connection pin 7, as is demonstrated with reference to FIGS. 9 and 10.

Figure 9:
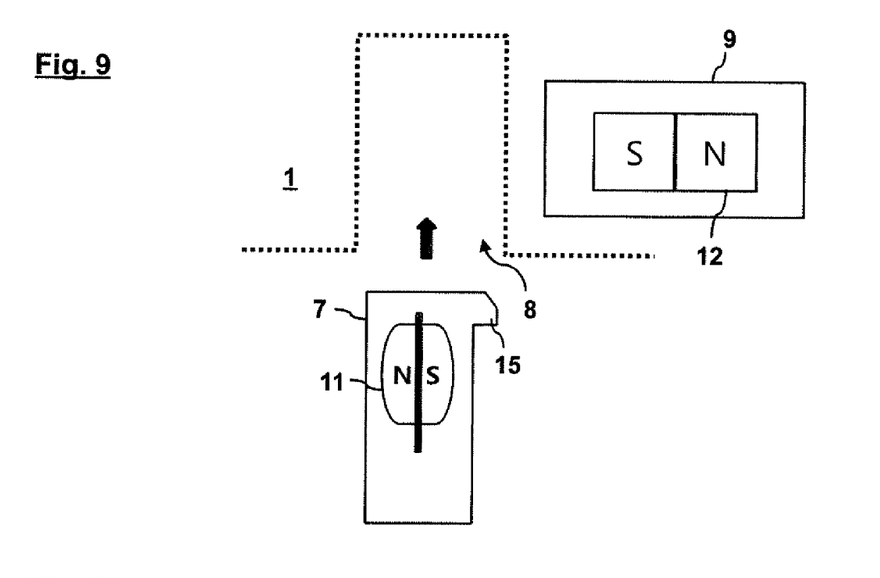
FIGS. 9 and 10 schematically show a magnetic latch system used in the loading system of FIG. 2.
Figure 10:
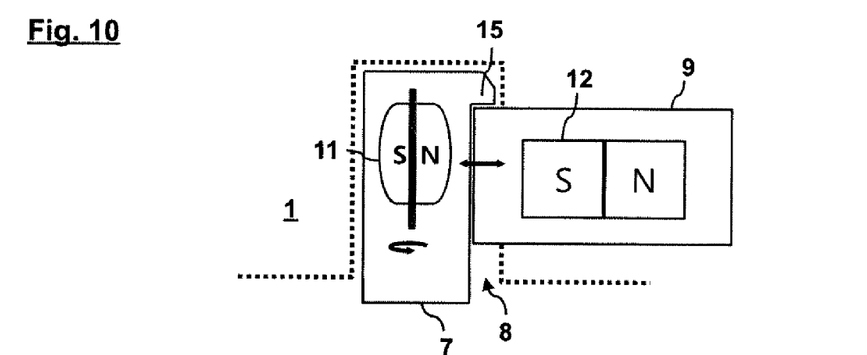

As shown in FIGS. 9 and 10, the connection pin 7 features a rotatable permanent magnet 11. The locking pin 9 on the other hand is configured movable within the connection hole 8 and also provided with an integrated permanent magnet 12. To lock the magnetic latch, the rotatable permanent magnet 11 of the connection pin 7 may be rotated by about 180° once the connection pin has been inserted or introduced in the connection hole 8 to orient the magnetic poles of the rotatable permanent magnet 1 such that the movable locking pin 9 is magnetically drawn against the connection pin 7. As shown in FIGS. 9 and 10, the connection pin 7 may be formed with an undercut 15, which blocks movement of the connection pin 7 once the locking pin 9 has been fully drawn against it, thereby closing the magnetic latch and fixing the upper body structure 1 in position on top of the vehicle platform 2.

Similarly, the engaging portion 4 of the loading arms 3 may be locked with the support portions 5 of the upper body structure 1 during the loading/unloading procedure to secure the upper body structure 1 to the loading arms 3 via the support portions 5. Accordingly, the engaging portions 4 and the support portions 5 may be provided with corresponding (rotatable) permanent magnets or similar means to form a latch.

Figure 3:
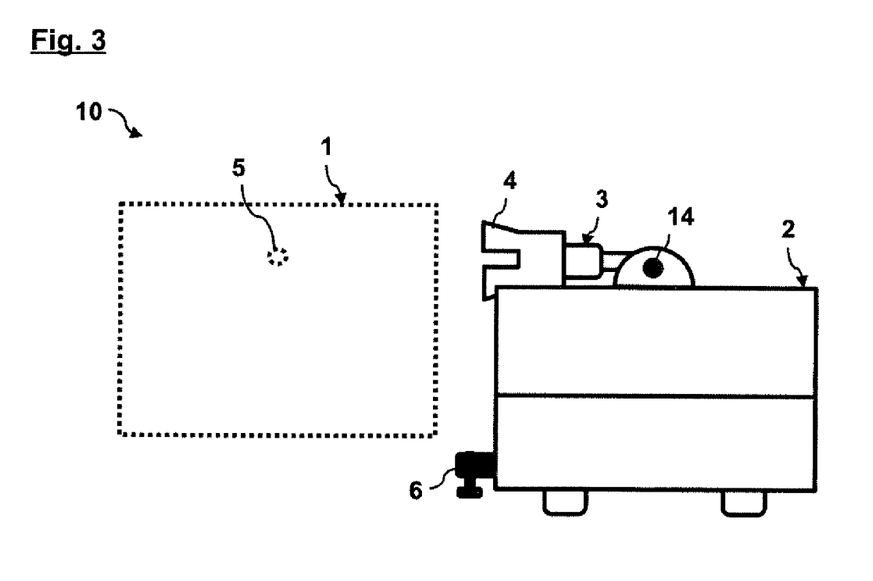
FIG. 3 to 8 depict successive steps of a loading process using the system of FIG. 2.

FIGS. 3 to 8 depict successive steps of a loading process using the system 10 of FIG. 2. In FIG. 3 the vehicle platform 2 may be autonomously positioned next to the upper body structure 1. The exact position may be realized, for example, by adequate data exchange between sensor systems of the vehicle platform 2 and the upper body structure 1 (not shown). As shown in FIG. 3, the loading arms 3 are already swiveled into the lateral orientation pointing with the engaging portions 4 at the corresponding support portions 5 on the upper body structure 1. The support legs 6 are not yet extended out of the vehicle platform 1 and are not yet resting on the ground.

Figure 4:
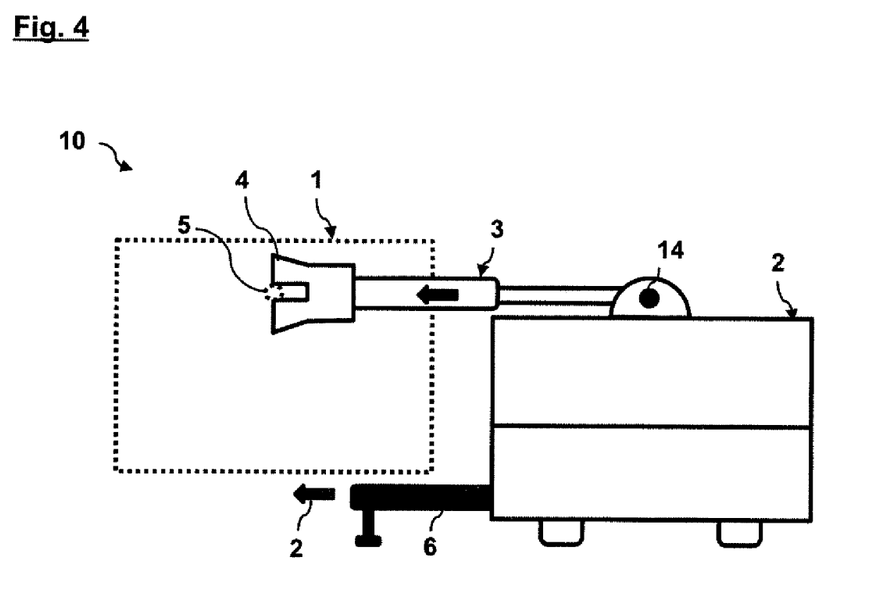
Figure 5:
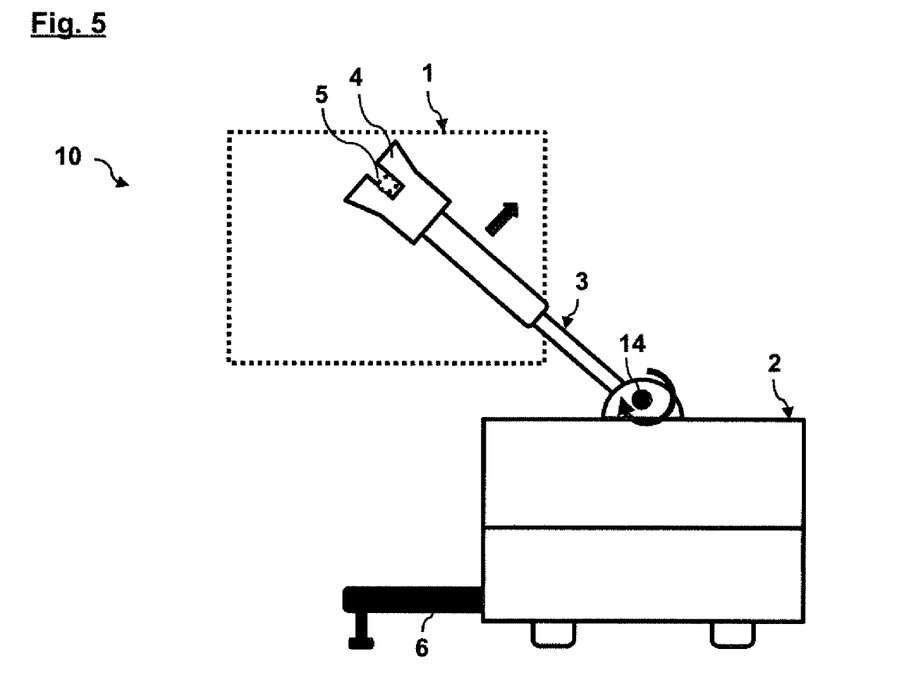

Referring now to FIG. 4, the support legs 6 are now moved out and set on the ground to stabilize the vehicle platform 2 during the loading procedure. Next, the loading arms 3 are extended such that the engaging portion 4 of each loading arm 3 grabs the respective support portion 5 on the upper body structure 1. As shown in FIG. 5, the loading arms 3 are now jointly swiveled upwards, thereby lifting the upper body structure 1 upwards.

Figure 6:
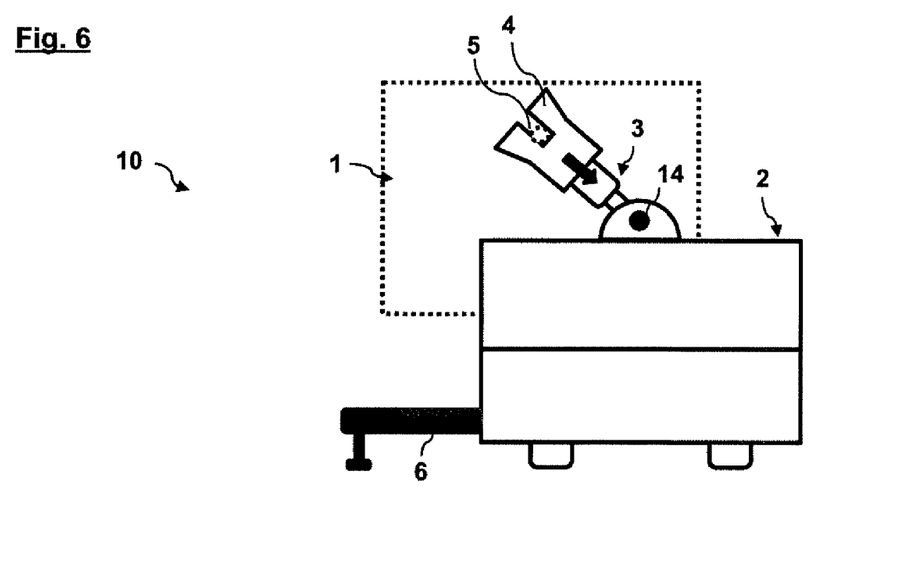
Figure 7:
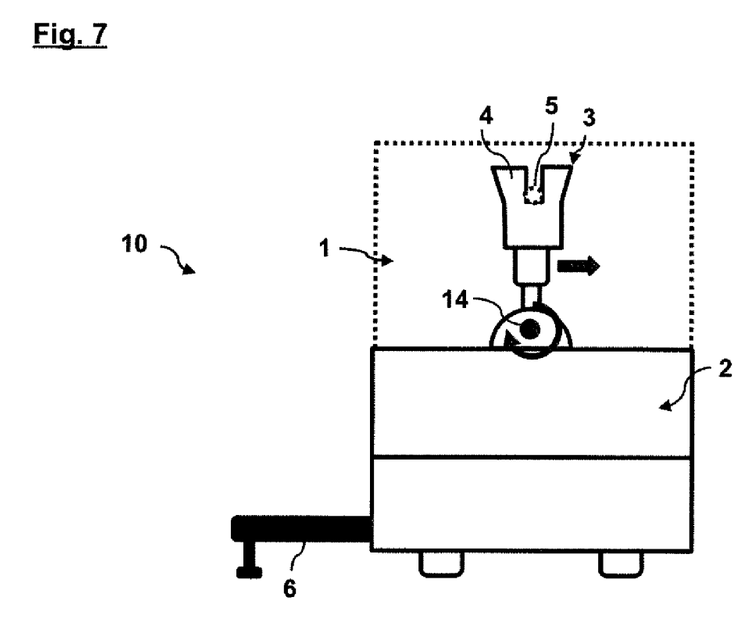
Figure 8:
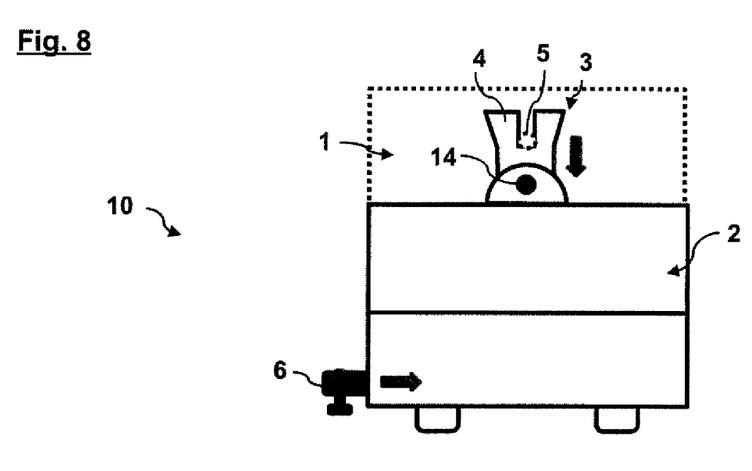

Before the loading arms 3 reach the fully upward orientation as shown in FIG. 7, each loading arm's 3 length may be reduced first within an interim orientation by retracting the loading arms 3 telescopically as shown in FIG. 6. Accordingly, the center of gravity of the upper body structure 1 may be shifted downwards and towards the vehicle platform 2, thereby reducing the lever arm and reducing the momentum acting on the system 10.

Once the loading arms 3 have reached the upward orientation as shown in FIG. 7, they are retracted towards the vehicle platform 2 to lift the upper body structure 1 onto the vehicle platform 2. Both components may be aligned relative to each other to insert or introduce the connection pins 7 of the vehicle platform 2 in the connection holes 8 of the upper body structure 1. The magnetic latches may then be moved into the locked configuration, thereby fixing the upper body structure 1 on top of the vehicle platform 2. Finally, the support legs 6 may be moved back into the vehicle platform 2.

Figure 11:
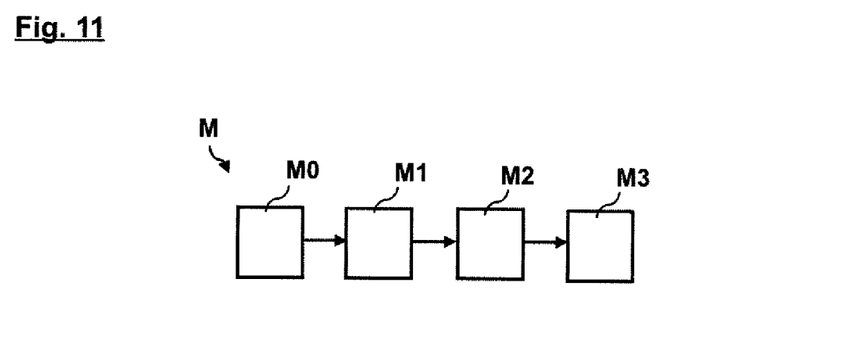
FIG. 11 shows a flow diagram of a method for using the loading system of FIG. 2.

FIG. 11 shows a flow diagram of a corresponding method M for using the loading system 10 of FIG. 2 accordingly. The method M may include under M0 extending the support leg 6 at each lengthwise end of the vehicle platform in the lateral direction 13 and thereby stabilize the vehicle platform 2 on the ground against tipping. The method may further include under M1 engaging and releasing, respectively, the upper body structure 1 with the loading arms 3 by swiveling the loading arms 3 into the lateral orientation and by extending and retracting, respectively, the loading arms 3 within the lateral orientation. Additionally, the method M may include under M2 jointly retracting and extending the loading arms 3 in interim orientations between the upward orientation and the lateral orientation to optimize the center of gravity of the engaged upper body structure 1. Finally, the method M may include under M3 mounting the engaged upper body structure 1 on top of the vehicle platform 2 by swiveling the loading arms 3 with the engaged upper body structure 1 into the upward orientation and by retracting the loading arms 3 with the engaged upper body structure 1 within the upward orientation.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The exemplary embodiments were chosen and described in order to explain the principles of the invention and its practical applications, to enable others skilled in the art to utilize the invention and various embodiments with various modifications as are suited to the particular use contemplated.

REFERENCE LIST 1 upper body structure
2 vehicle platform
3 loading arm
4 engaging portion
5 support portion
6 support leg
7 connection pin
8 connection hole
9 locking pin
10 loading system
11 rotatable permanent magnet
12 permanent magnet
13 lateral direction
14 rotary drive
15 undercut
100 motor vehicle
M method
M0-M3 method steps

What is claimed is:

1. A loading system for laterally loading and unloading an upper body structure onto and from a vehicle platform of a motor vehicle, the loading system comprising:
   two loading arms pivotably mounted on respective lengthwise ends of the vehicle platform, the loading arms being configured to jointly swivel between an upward orientation and a lateral orientation with respect to the vehicle platform and to jointly extend and retract,
   wherein each loading arm includes an engaging portion at a distal end of the respective loading arm configured to engage a correspondingly formed support portion at a respective lengthwise end of the upper body structure, wherein the loading arms are configured to engage and release, respectively, the upper body structure by swiveling into the lateral orientation and by extending and retracting, respectively, within the lateral orientation, and wherein the loading arms are configured to mount the engaged upper body structure on top of the vehicle platform by swiveling with the engaged upper body structure into the upward orientation and by retracting with the engaged upper body structure within the upward orientation;

wherein the vehicle platform and the upper body structure include a plurality of connection pins and correspondingly formed connection holes, into which the connections pins are inserted when the upper body structure is mounted on top of the vehicle platform;

wherein each connection hole includes a movable locking pin configured to lock the connection pin within the connection hole; and wherein each locking pin and the corresponding connection pin together form a switchable magnetic latch, wherein each locking pin is configured as a permanent magnet and each connection pin is configured as a rotatable permanent magnet to switch the magnetic latch.

2. The loading system according to claim 1, wherein the loading arms are configured as telescopic arms to retract and extend.

3. The loading system according to claim 2, wherein each engaging portion is configured as a lifting fork and the corresponding support portion is configured as a pin extending from the upper body structure.

4. The loading system according to claim 3, wherein the loading arms are configured to swivel to both lateral sides of the vehicle platform.

5. The loading system according to claim 4, wherein the vehicle platform includes an extendable support leg at each lengthwise end configured to extend in the lateral direction and stabilize the vehicle platform on the ground against tipping.

6. The loading system according to claim 5, wherein the loading arms are configured to jointly retract and extend in interim orientations between the upward orientation and the lateral orientation to change the center of gravity of the engaged upper body structure.

7. A motor vehicle having a loading system according to claim 1.

8. The motor vehicle of claim 7, wherein the motor vehicle is an electric motor vehicle.

* * * * *